United States Patent [19]

Spies et al.

[11] 4,020,453

[45] Apr. 26, 1977

[54] SENSING SYSTEM FOR ACTUATING A SAFETY DEVICE

[75] Inventors: Johann Spies, Pfaffenhofen, Jlm; Alfons Wöhrl, Schrobenhausen, both of Germany

[73] Assignee: Messerschmitt-Bolkow-Blohm GmbH, Munich, Germany

[22] Filed: Nov. 13, 1975

[21] Appl. No.: 631,674

[30] Foreign Application Priority Data

Nov. 16, 1974 Germany .......................... 2454424

[52] U.S. Cl. ............................. 340/52 H; 340/262; 307/121; 180/91
[51] Int. Cl.² .................. B60R 21/00; H01H 35/14
[58] Field of Search ............ 340/52 H, 66, 71, 262; 307/9, 10 R, 121; 180/91

[56] References Cited

UNITED STATES PATENTS

| | | | |
|---|---|---|---|
| 3,633,159 | 1/1972 | Dillman | 340/52 H |
| 3,870,894 | 3/1975 | Brede et al. | 340/52 H X |

Primary Examiner—Alvin H. Waring
Attorney, Agent, or Firm—Toren, McGeady and Stanger

[57] ABSTRACT

An acceleration sensing and safety-device actuating system, for actuating a safety device, such as a crash-sensitive automobile air bag detonator. A differential amplifier forms part of an operational integrator responsive to an acceleration sensor and a reference potential. A threshold device, responsive to proper operation of the reference potential, triggers an output stage to set off the safety device when the differential amplifier output indicates a given deceleration. An isolating circuit isolates the output stage for a given time after starting the automobile. A control switch shorts the operating voltage in response to low operating potential or an inoperative safety circuit, and turns on a warning indicator.

8 Claims, 1 Drawing Figure

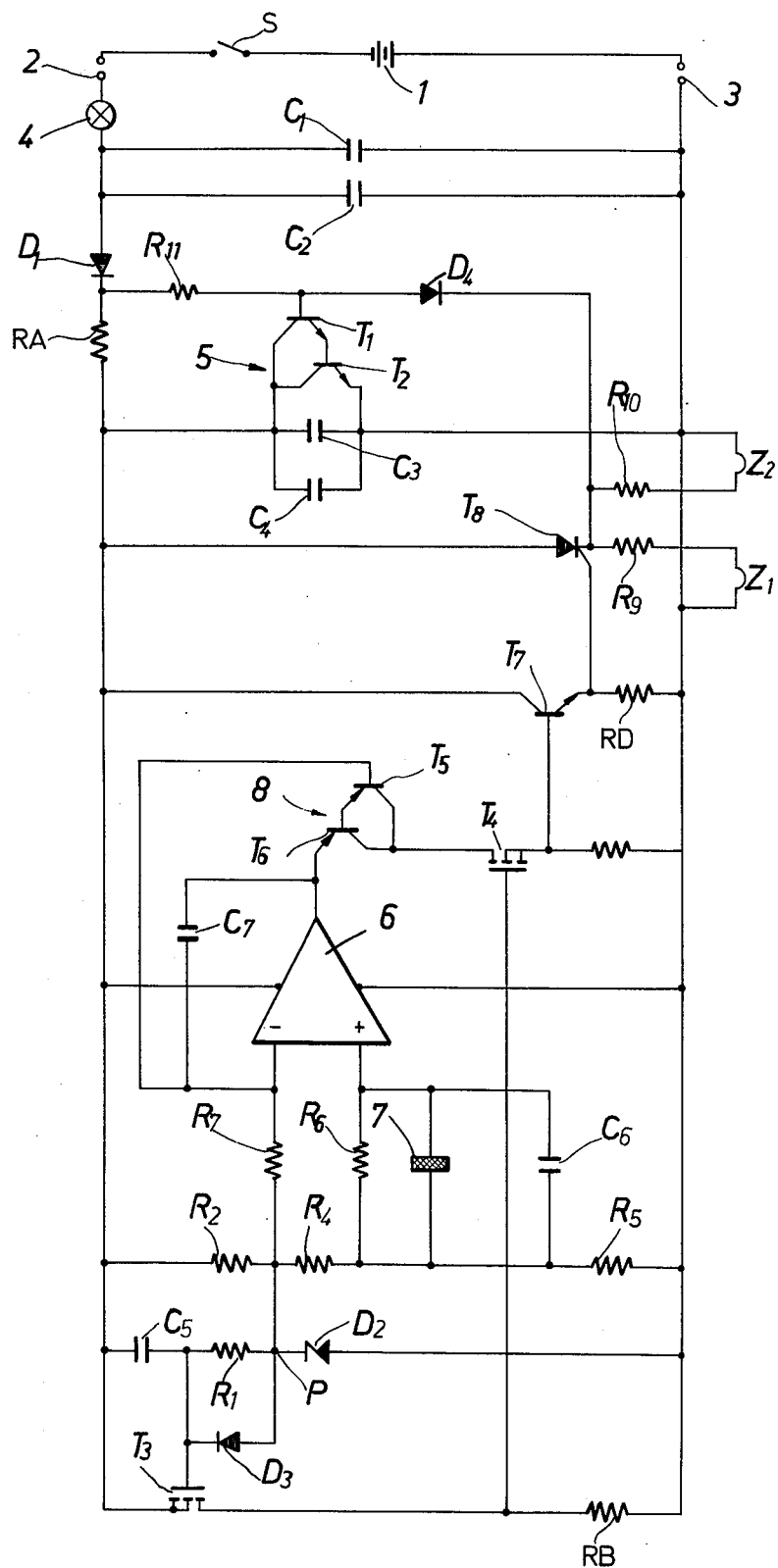

SENSING SYSTEM FOR ACTUATING A SAFETY DEVICE

BACKGROUND OF THE INVENTION

This invention relates to electronic systems for sensing dangerous conditions and actuating safety devices, and particularly to a crash-responsive air-bag detonator for motor vehicles.

Such systems may, for example, be composed of an acceleration sensor, a sensor-responsive evaluation circuit, and an output stage. In one such system, the evaluating circuit is composed of a threshold device which conducts only if the acceleration sensor output signal reaches or exceeds a predetermined magnitude, a preamplifier, an integrator, and a threshold switch. The precision of the entire sensor system depends specifically on the precision of the evaluating circuit components. Establishing a zero or null and a threshold value for these components requires different reference voltages. To avoid drift of the system entered data, these reference voltages and the differences between the individual reference voltages must be held stable.

As a further point, these known circuits involve starting difficulties unless additional auxilliary circuits are used. For example, resetting the integrator in the evaluating circuit, either during starting or during operation of the system, may create a signal which should not, but might, reach the output stage and actuate the safety device.

These known circuits also have the disadvantage of failing to indicate defects to the driver or indicate such defects only by means of complex auxilliary circuits.

An object of the invention is to avoid disadvantages of these systems.

Another object of the invention is to improve systems of this type.

SUMMARY OF THE INVENTION

According to a feature of the invention these objects are attained by a system having a differential amplifier to which one connection of an acceleration sensor is coupled, a second-connection of the acceleration sensor being coupled to the center point of a voltage divider, which is in turn connected at one end to a constant reference potential and at the other end to one power terminal. The power terminal is connectable to a voltage source.

The second input of the differential amplifier is connected to the reference point by an integrating resistance, to the output of the differential amplifier by an integrating capacitor, and to the control electrode of a threshold switch in series with the differential amplifier output.

Further, an additional controllable isolating switch isolates the threshold value switch from the output stage as long as the operating voltage is not, for a minimum period, above a lower limit value necessary for the operability of the entire system.

An integrated circuit component is used for the differential amplifier. This system has the advantage of greatly reducing the number of components used relative to prior systems. In particular, it combines the function of several elements, namely that of the preamplifier, of the threshold value member, and of the integrator, In addition, starting difficulties are overcome because the coupling of the output stage to the evaluation circuit takes place only after a given time. Moreover, all components essential for the partial functions of the system receive their reference voltage from a single common reference source. Thus the input settings of the system remain constant during operation. For this reason the system operates precisely and reliably. Moreover, there are only few passive components which directly influence the precision of the system, e.g. the voltage-divider resistors, the integrating resistor and the integrating capacitor, and the zener diode generally used for the derivation of the reference voltage. Adjustment is very simple. The components are selected and interconnected so that the close thermal coupling in monolithic construction of the system compensates for temperature drift of its characteristics.

According to another feature of the invention the time before the output stage is coupled to the evaluating circuit by the isolating switch is controlled by a timing element between the operating voltage source and the reference point. At least one circuit point of the timing element is connected with the control electrode of a voltage-dependent switch, which in turn actuates the switch which couples the output stage to the evaluating circuit.

The time before the output stage is coupled to the other circuit elements is chosen, for example, to be five seconds.

The aforementioned stepped switch for coupling of the output stage has the advantage of responding to operating voltage decreases by again separating the output stage from the evaluating circuit. Thus any malfunctions of the circuit produced by the decrease of the operating voltage are not passed on to the output stage.

According to another feature of the invention the operating time of the circuit is further lengthened by capacitors connected in parallel with the operating voltage source. Upon failure of the operating voltage source these capacitors serve as an emergency voltage source in case of collision of the vehicle. The engergy of the capacitors is sufficient to keep the circuit operative and to activate the safety device during the critical period after a collision of the vehicle.

As a further safety precaution, a controlled threshold switch is connected parallel to the capacitors. The controlled threshold switch is composed of a cascade circuit of two transistors. A control voltage obtained from the operating voltage and the voltage drop produced across the intact ignition element of the safety device by flow of a low test current. The threshold value switch is constructed so that it conducts when the control voltage decreases, for instance upon failure of the ignition element or when the operating voltage decreases. The completed circuit includes an indicating means, preferably a light which warns a driver of the vehicle of a defect of the ignition elements or their connecting lines, or of the circuit. The light at the same time serves as a charging resistance for the capacitors that operate as emergency voltage source and thus makes it possible to check proper starting and operation of the entire circuit.

These and other features of the invention are pointed out in the claims forming a part of this specification. Other objects and advantages of the invention will be evident from the following detailed description when read in light of the accompanying drawing.

BRIEF DESCRIPTION OF THE DRAWING

The drawing is a schematic diagram illustrating a system embodying features of the invention.

DESCRIPTION OF PREFERRED EMBODIMENTS

In the drawing, an ignition switch S, when closed, connects a voltage source or battery 1 of a motor vehicle with power terminals 2 and 3 of a safety device electric sensor and actuator. Capacitors C1 and C2 both connected across the terminals 2 and 3 smooth the operating voltage and limit overvoltages. A light 4 forms a charging path for charging the capacitors C1 and C2. A diode D1 and a resistor RA, together with the light 4, form a charging path for two additional capacitors C3 and C4. The latter serve as an emergency voltage source if the battery is destroyed upon collision of the motor vehicle. They also furnish the ignition energy for two ignition elements Z1 and Z2. The elements Z1 and Z2 are of a known type used for actuation of gas generators which inflate an air cushion or air bag that receives and protects passengers hurled forward during collision of the vehicle.

Two transistors T1 and T2 form a threshold switch 5 in parallel with the two capacitors C3 and C4. The switch 5 monitors the operability of the ignition elements Z1 and Z2.

A Zener diode D2 draws current from the source 1 through a resistor R2 to establish a reference potential at a reference point P. The point P and the junction of a resistor R1 and capacitor C5, which together form a timing circuit, establish the potential at the gate of a field effect transistor T3. The path of major current flow through the transistor T3 passes through a resistor RB. The transistor T3 is connected to the gate of another field effect transistor T4. The path of major current flow of the transistor T4 lies between an evaluating circuit whose core is an integrated-circuit differential, or difference, amplifier 6, and an output stage containing the ignition elements Z1 and Z2. The differential amplifier 6 may be of the typ ICL 8007, described in "Operationsverstarker mit FET-Eingang, Serie 8007", published by "Intersil incorp.", obtainable from "Special Elektronik KG, 8 Munich 70, OrtlerstraBe 8", or any amplifier of the same kind.

A piezo-electric acceleration sensor 7 is connected to one input of the differential amplifier 6 and to the tap of a voltage divider composed of resistors R4 and R5 and connected between the terminal 3 and the reference point P. A resistor R6 connected across the acceleration sensor 7 eliminates the charge caused by the piezo-electric effect in the sensor 7. A capacitor C6 trims the sensitivity of the sensor 7. The values of the resistor R6 and capacitor C6 as well as the equivalent capacitance of the acceleration sensor 7 establish the lowest perceivable frequency limit.

An integrating capacitor C7 forms a negative feedback from the output of the differential amplifier to its second input where it coacts with an integrating resistor R7. A threshold switch 8 composed of two transistors T5 and T6 has the T6 emitter connected to the output of the differential amplifier. The control electrode of the threshold value switch 8 at the base of transistor T5 is also connected to the second input of the differential amplifier 6. A driver transistor T7 with an emitter resistor RD actuates a thyristor T8. The latter, when conducting, discharges the energy of the capacitors C3 and C4 through ignition elements Z1 and Z2 as well as small protective resistances R9 and R10.

In operation, after the switch S connects the battery 1 to the sensor circuit at the terminals 2 and 3, the voltage at the gate of transistor T3 increases until it exceeds the threshold value. At this moment, the transistor T3 becomes conductive and renders transistor T4 conductive. This closes the current path from the threshold value switch 8 to the driver transistor T7. Until this time, the sensor has been inactive so that starting difficulties do not arise. Transistor T7 advantageously separates the output from the actual evaluating circuit of the sensor as soon as the operating voltage falls below the specified value.

The integrator is composed of the differential amplifier 6, the resistor R7 and the capacitor C7. Decelerations acting upon the acceleration sensor 7 establish the voltage signal appearing at the acceleration sensor 7, diminished by the voltage across the resistor R4, at the inputs of the integrator.

The circuit automatically holds the integrator at a null position as long as no accelerations act upon the piezo-electric acceleration sensor 7. Also, accelerations below a given value, such as normal driving vibrations or shocks, are not passed on to the integrator. If an acceleration effect which has faded, and which has not resulted in activation of the ignition elements Z1 and Z2, has brought the integrator above the zero position, it is brought back to the zero position. Cumulative or additive integration is not possible.

Only a collision of the motor vehicle produces a deceleration considerably above the driving vibrations of the vehicle. It is only the signal delivered by the acceleration sensor, decreased by the given amount, that is perceived by the integrator and used to actuate the threshold value switch 8. The latter switches only in response to an integrated signal beyond a critical magnitude. The path of major current flow of the field effect transistor T4 supplies this signal to the transistor T7 and renders thyristor T8 conductive. As a result, the capacitors C3 and C4 are discharged through the ignition elements Z1 and Z2.

The circuit arrangement described includes several safety devices which indicate defects to the driver to the motor vehicle. For example, as long as the capacitors C1 to C4 are being charged, the light 4 serves as a charging resistance and is on. The light thus indicates to the driver that the circuit is not yet ready for operation.

Even if a short circuit exists, a current great enough for the light not to be extinguished flows constantly. Starting disturbances within the circuit, such as pulses at the differential amplifier 6, cannot reach the output stage because the latter is coupled to the other components by the field defect transistor T4 only after the time determined by the timing circuit composed of resistors R1 and R2 and capacitors C5. This time begins to run only when the voltage at the timing circuit has reached a specific voltage which correspond to the sum of the reference voltage at point P and the threshold voltage at the gate of the field defect transistor T3.

The circuit also indicates a failure in the line to the ignition elements Z1 and Z2, or in these elements themselves. For this purpose, the base of the first transistor T1 in the threshhold switch 5 is connected both to the blocking diode D1 through the resistor R11, and to the terminal 3, through a blocking diode D4, resistors R9 and R10, and ignition elements Z1 and Z2. A defect in the line to the ignition elements, or in the ignition elements Z1 and Z2, renders the switch 5 conductive. This closes the circuit leading from battery 1 through the light 4 and the threshold switch 5, thereby turning on the light 4. At the same time, the voltage at the sensor circuit is lowered to the extent that the field effect transistor T4 turns off and separates the output stage from the rest of the components.

Independently of a failure of the ignition elements Z1 and Z2, if the operating voltage at the terminals 2 and 3 decreases below the minimum operating voltage, the field effect transistor T4 becomes nonconductive. This also separates the output stage from the rest of the components.

The described circuit is simple to construct and at the same time effective and precise. All active circuit elements determining the precision of the circuit derive their reference voltage from a single point. Also, the circuit can be constructed so that defects are immediately indicated to the driver.

The invention simplifies prior systems and in particular reduces the circuit elements used, and affords a system which as a whole functions reliably and precisely. Starting difficulties are suppressed and cannot occur during operation of the safety device. Defects can be quickly detected, and few components need be critically selected or adjusted.

When the circuit is switched on, the capacitor C5 charges through a relatively high impedance resistor R1 at a rate determined by the values of C5 and R1. When the circuit is shut off, the diode D3 causes the capacitor C5 to discharge through the resistor R2 and the diode D3 at a rate far more rapid than the charging rate. As a result, when there are disturbances in the current supply, the transistor T3 is rapidly switched off and is switched on again only after a predetermined time determined by the time constant of members C5 and R1. This prevents undesired ignition of the ignition elements Z1 and Z2 in response to influences such as voltage or current fluctuations. The base of transistor T5 of the threshold switch 8 is controlled by the negative imput of the differential amplifier 6. This causes the threshold switch 8 to switch only when the voltage difference between the negative input and the output of the differential amplifier exceeds a predetermined value. The differential amplifier acts as an integrator in conjunction with the capacitor C7 and the resistor R7. Thus the signal of the acceleration sensor 7, decreased by an amount determined by the resistor R4, is integrated. Only when the value of the integrated signal reaches the threshold value necessary for switching the threshold switch 8 can the threshold switch 8 become conductive along its emitter-collector path so that current flows from the output of the differential amplifier to the base of the transistor T7.

While an embodiment of the invention has been described in detail it will be evident to those skilled in the art that the invention may be embodied otherwise without departing from its spirit and scope.

What is claimed is:

1. A sensing circuit for actuating a vehicle safety device, comprising two terminals connectable to a voltage source, an acceleration sensor having two connections, evaluating means coupled to the acceleration sensor for responding to the acceleration sensor, and an output stage coupled to the evaluating means for operating the safety device in response to the evaluating means.

said evaluating means including a differential amplifier having a first input and a second input and an output, a voltage divider having a center point and two end points, constant potential producing means coupled to one of said terminals and having a reference point for producing a reference potential at the point relative to the one of said terminals, an integrating resistor, an integrating capacitor, a threshold value switch having a control electrode, and isolating means for controllably isolating said threshold value switch from said output stage;

one connection of said acceleration sensor being connected to one input of the differential amplifier, the other connection of said acceleration sensor being connected with the center point of the voltage divider, one end point of said voltage divider being coupled to the reference point and the other to the one of said terminals, said integrating resistor connecting the second input of said differential amplifier to the reference point, said integrating capacitor being connected from the output of said differential amplifier to the second input; said second input being connected with the control electrode of said threshold value switch, said threshold value switch having a path main current flow connected in series with the output of said differential amplifier.

said isolating means being connected between said threshold value switch and said output stage and being responsive to the voltage across said terminals for isolating said threshold value switch from said output stage until the voltage across said terminals reaches a predetermined value. --

2. An apparatus as in claim 1, wherein said isolating means includes an isolating switch and a voltage dependent switch, said evaluating means including a timing arrangement having a pair of voltage detecting points and a timing output junction, said voltage detecting points being connected between said reference point and one of said terminals, said voltage dependent switch having a control electrode, said timing output junction beng connected to said control electrode, said voltage dependent switch being connected to said isolating switch to actuate said isolating switch in response to the timing arrangement and the voltage at said terminals.

3. An apparatus as in claim 1, wherein said evaluating means includes a threshold value switch, coupling means coupling said threshold value switch across the terminals, said coupling means including an indicator, said threshold value switch having a control element, test current generating means coupled to said safety device for passing a test current therethrough, said test current generating means being coupled to said threshold value switch for controlling said threshold value switch on the basis of the test current, said test current switch responding to decreases in the test current by closing, said threshold value switch, when closed, being in circuit relationship with said indicator to actuate said indicator.

4. An apparatus as in claim 2, a sensing circuit for actuating a vehicle safety device, comprising two terminals connectable to a voltage source, an acceleration sensor having two connections, evaluating means coupled to the acceleration sensor for responding to the accleration sensor, and an output stage coupled to the evaluating means for operating the safety device in response to the evaluating means;

said evaluating means including a differential amplifier having a first input and a second input and an output, a voltage divider having a center point and two end points, constant potential producing means coupled to one of said terminals and having a reference point for producing a reference potential at the point relative to the one of said terminals, an integrating resistor, an integrating capacitor, a threshold value switch having a control electrode, and isolating means for controllably isolating said threshold value switch from said output stage;

one connection of said acceleration sensor being connected to one input of the diffential amplifier, the other connection of said acceleration sensor being connected with the center point of the voltage divider, one end point of said voltage divider being coupled to the reference point and the other to the one of said terminals, said integrating resistor connecting the second input of said differential amplifier to the reference point, said integrating capacitor being connected from the output of said differential amplifier to the second input, said second input being connected with the control electrode of said threshold value switch, said threshold value switch having a path of main current flow connected in series with the output of said differential amplifier, said isolating means being connected between said threshold value switch and said output stage and being responsive to the voltage across said terminals for isolating said threshold value switch from said output stage until the voltage across said terminals reaches a predetermined value, said isolating means including an isolating switch and a voltage dependent switch, said evaluating means including a timing arrangement having a pair of voltage detecting points and a timing output junction, said voltage detecting points being connected between said reference point and one of said terminals, said voltage dependent switch having a control electrode, said timing output junction being connected to said control electrode, said voltage dependent switch being connected to said isolating switch to actuate said isolating switch in response to the timing arrangement and the voltage at said terminals, said evaluating means including coupling means coupling said threshold value switch across the terminals, said coupling means including an indicator, said treshold value switch having a control element, test current generating means coupled to said safety device for passing a test current therethrough, said test current generating means being coupled to said threshold value switch for controlling said threshold value switch on the basis of the test current, said test current switch responding to the decreases in the test current by closing, said threshold value switch, when closed, being in circuit relationship with said indicator to actuate said indicator. --

5. An apparatus as in claim 1, wherein said evaluating means includes a plurality of capacitors, means coupling said capacitors across said terminals to store energy from voltage applied to said terminals and thereby serve as an emergency voltage source.

6. An apparatus as in claim 2, wherein said evaluating means includes a plurality of capacitors, means coupling said capacitors across said terminals to store energy from voltage applied to said terminals and thereby serve as an emergency voltage source.

7. An apparatus as in claim 3, wherein said evaluating means includes a plurality of capacitors, means coupling said capacitors across said terminals to store energy from voltage applied to said terminals and thereby serve as an emergency voltage source.

8. An apparatus as in claim 4, wherein said evaluating means includes a plurality of capacitors, means coupling said capacitors across said terminals to store energy from voltage applied to said terminals and thereby serve as an emergency voltage source.

* * * * *